Jan. 15, 1924.

F. J. STRAUB

MACHINE FOR MAKING BUILDING BLOCKS

Filed Nov. 30, 1920

Witnesses:
Edwin Trueb
Lois Thuneman

Inventor:
Francis J. Straub
by C. M. Clarke
Attorney

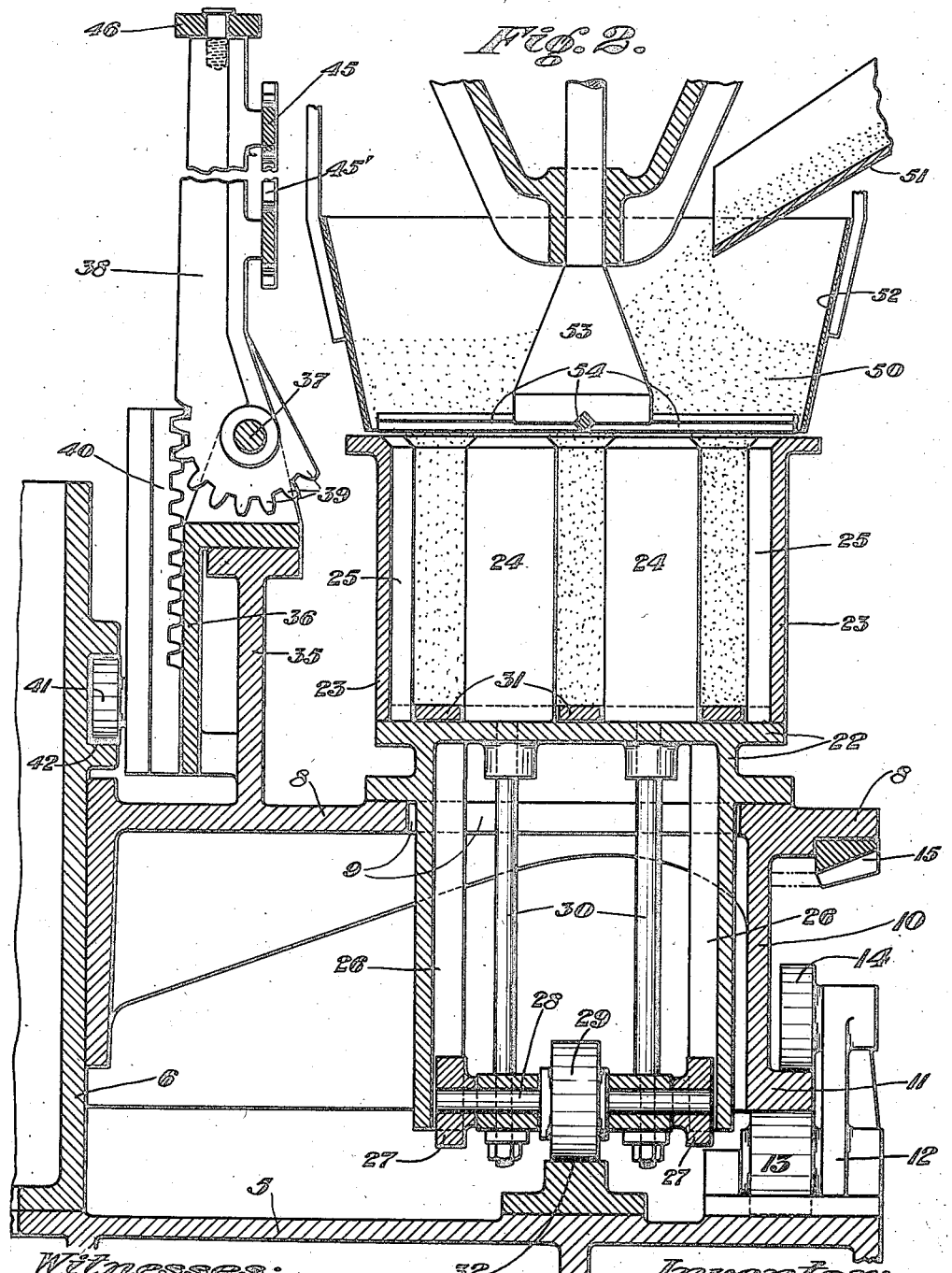

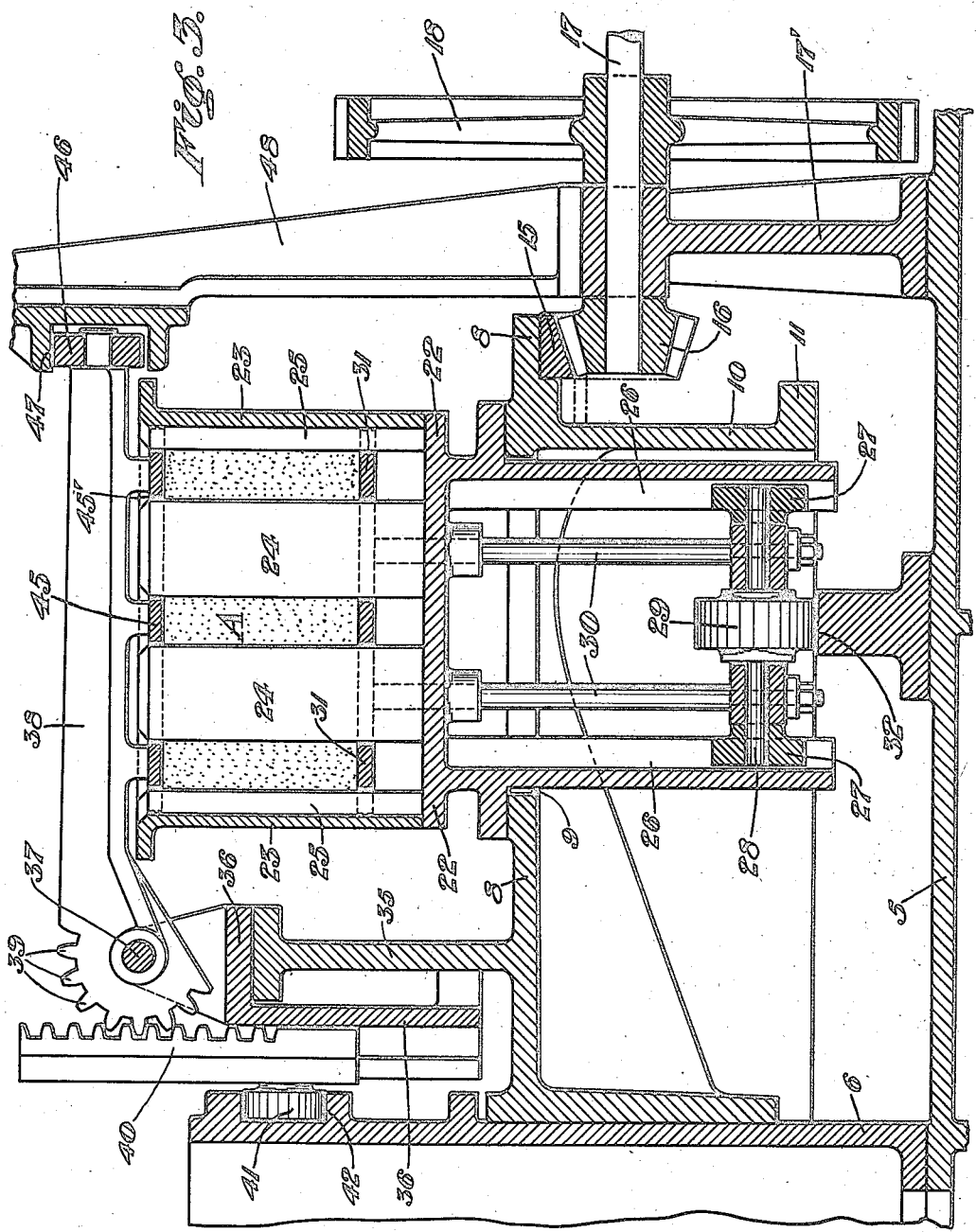

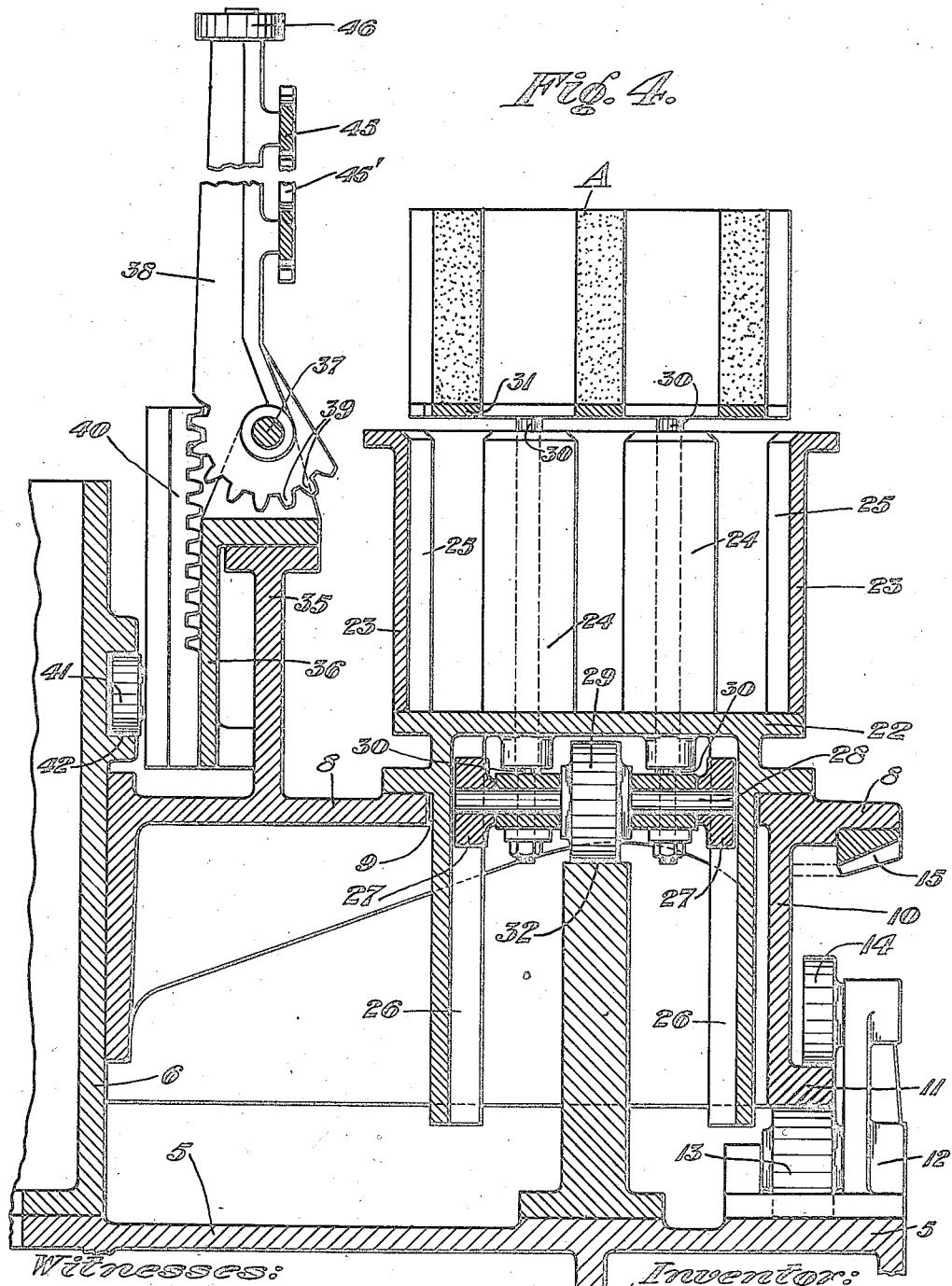

Jan. 15, 1924.                                                1,481,159
F. J. STRAUB
MACHINE FOR MAKING BUILDING BLOCKS
Filed Nov. 30, 1920          5 Sheets-Sheet 5
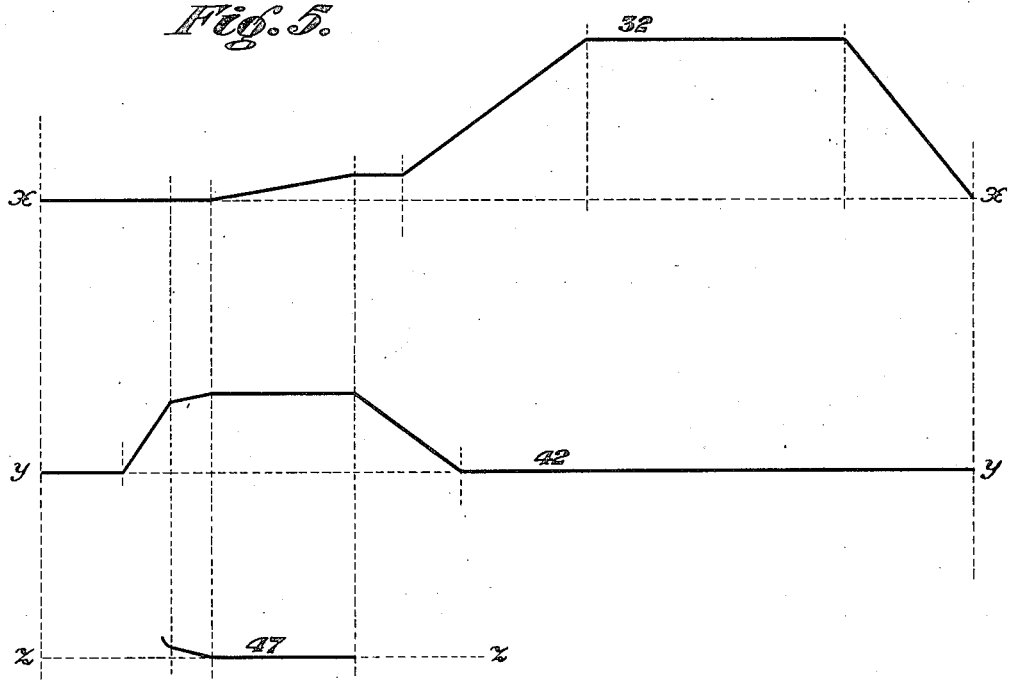
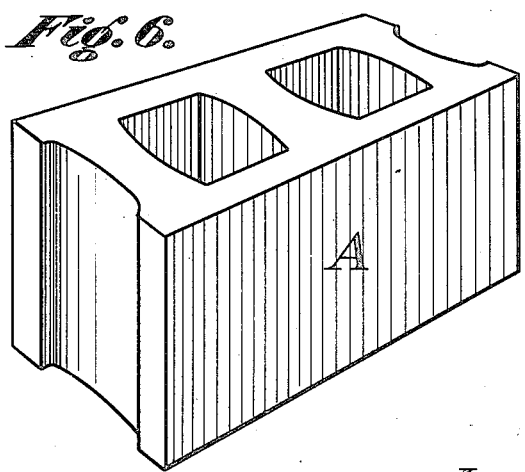

Patented Jan. 15, 1924.

1,481,159

UNITED STATES PATENT OFFICE.

FRANCIS J. STRAUB, OF NEW KENSINGTON, PENNSYLVANIA, ASSIGNOR TO CROZIER-STRAUB, INC., OF NEW YORK, N. Y., A CORPORATION OF NEW YORK.

MACHINE FOR MAKING BUILDING BLOCKS.

Application filed November 30, 1920. Serial No. 427,288.

*To all whom it may concern:*

Be it known that I, FRANCIS J. STRAUB, a citizen of the United States, residing at New Kensington, in the county of Allegheny and State of Pennsylvania, have invented certain new and useful Improvements in Machines for Making Building Blocks, of which the following is a specification.

This invention relates to an apparatus for molding plastic blocks, such as composition building blocks of the type in which a continuous series of molds is subjected to the various filling, pressing, and ejecting operations to effect an uninterrupted automatic production of blocks so long as the machine is operated.

The primary object of the invention is to provide an improved automatic machine of this type for the continuous production of molded blocks.

Another object of the invention is to provide a machine in which the pressure is applied to the material in the molds at both ends thereof, in order to obtain blocks of substantially uniform density throughout.

These and other objects of the invention will be apparent from the following description.

According to my invention, an annularly traveling carrier or table positioned about a central stationary frame is provided, this table being provided with a series of molds, mold covers therefor, and mold pallet operating devices. Cam tracks or grooves are provided on the stationary supporting frame for engaging means on the carrier for operating the mold covers and pallet operating means in proper sequence. An automatic filling machine suitably positioned over the carrier serves to charge the molds as they pass therebeneath.

My invention may be more fully described in connection with the accompanying drawings, in which, Fig. 1 is a plan view of the apparatus;

Fig. 2 represents a vertical section on line II—II of Fig. 1 and shows a mold beneath the filling apparatus;

Fig. 3 is a vertical section on line III—III of Fig. 1, and shows a mold with the cover closed, the pallet partially raised, and the driving mechanism;

Fig. 4 is a vertical section on line IV—IV of Fig. 1, and shows the block ejected from the mold;

Fig. 5 is a diagrammatic view indicating the undulations of the various cam tracks and the relation which the various portions have to each other; and Fig. 6 is a perspective view of one of the molded blocks.

Figure 1:
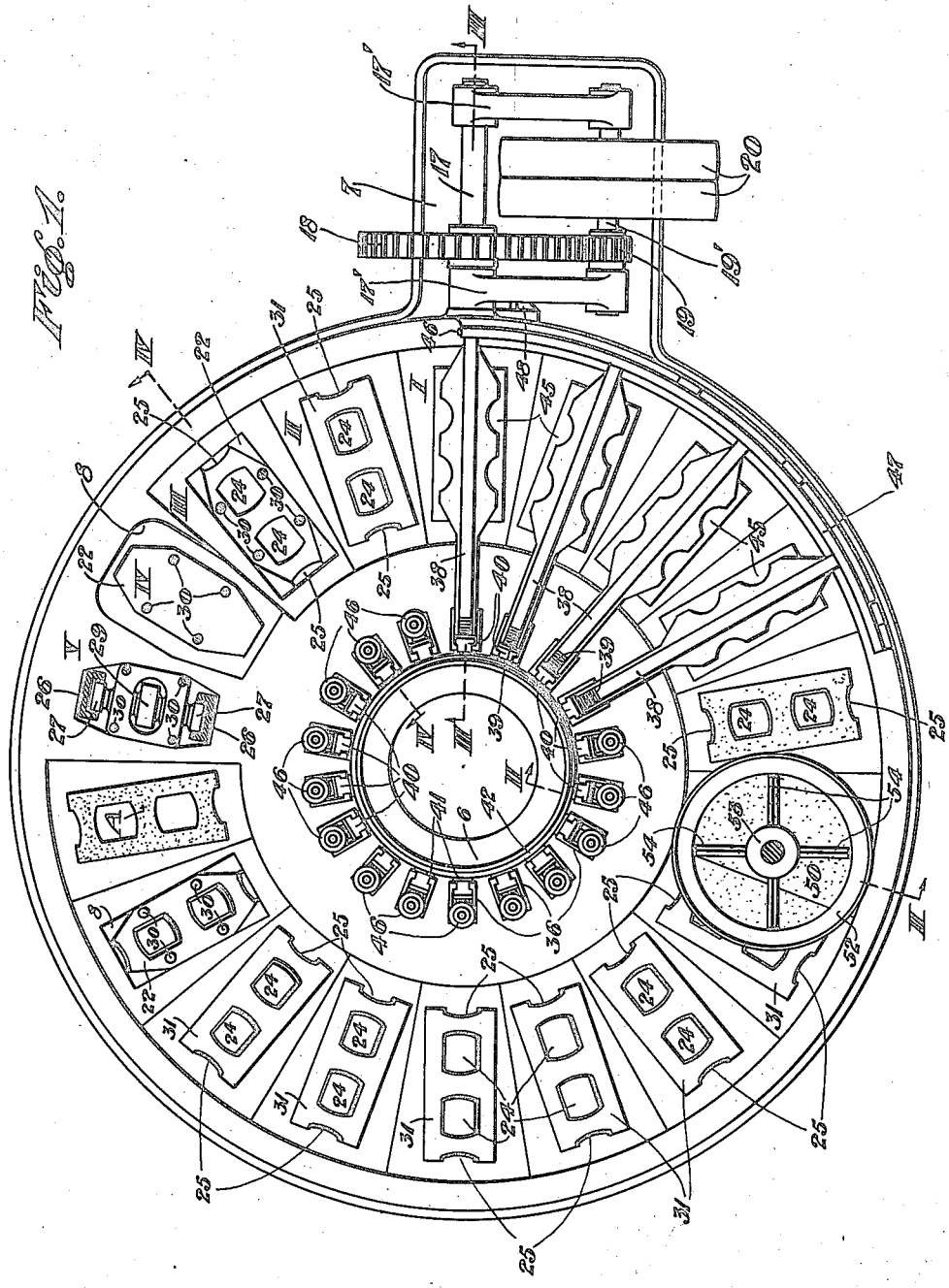

In the drawings, 5 represents a bottom frame member which may be fixed or movably mounted on any preferred structure and at the center of which is provided a stationary vertical frame 6 which serves as a support for an annular revoluble mold-carrying table 8. This table 8 is provided with a series of spaced apart openings 9 therein extending around the table, and near the periphery of the table is a depending flange 10 having a laterally extending flange 11, the under and top lateral surfaces of which are preferably inclined or beveled. Secured to the bottom frame member 5 at suitable positions are supports 12 having frusto-conical rollers 13 journalled on pins carried thereby and on which the lower face of lateral flange 11 rests, thus providing roller bearings for rotatably supporting the table. Rollers 14 on supports 12 engage the upper side of flange 11 to prevent the table from being forced upwardly.

On the under side of the table 8 at the periphery thereof is an annular rack 15. A pinion 16 keyed to shaft 17 engages with this rack and serves to rotate the table through the rotation of such shaft. The shaft 17 is mounted in suitable journals 17' secured to an extension 7 on the bottom frame member 5, and is driven through a large spur gear wheel 18 keyed thereto, this gear wheel 18 being engaged by a smaller pinion 19 on a parallel drive shaft 19' supported in the same way on shaft 17'. Loose and tight pulleys of large diameter, indicated at 20, are carried by the shaft 19 and they are rotated through a suitable belt, not shown, in the usual manner to operate the machine. This driving mechanism provides a reducing gear for transmitting motion to the table, but any other suitable means for rotating the table could be readily substituted.

Carried on the table 8 over the openings 9 are mold supports 22 on which are secured molds 23 and cores 24. End cores 25 are provided and may be formed separately from or integrally with the molds. Extending downwardly from the mold supports through the openings 9 are walls or guides 26. Reciprocable within the space enclosed by these walls is a cross-head 27 (see V, Fig. 1 and Figs. 2, 3 and 4) in which is a shaft 28 having a roller 29 thereon. Extending upwardly from the cross-head are rods 30 which extend through the mold supports 22 and have a slidable engagement therewith. These rods are adapted to engage the under side of pallets 31, slidably and removably fitted in the mold, and forming bottom members therefor. The roller 29 serves as a rolling bearing to reciprocate the cross-head 27 and the attached rods 30 by engagement with an undulating annular cam track 32 secured to the base 5. This cam undulates substantially as indicated in diagram by line $x$, $x$, in Fig. 5. As shown in Fig. 2, the cam track is at its lowest position and in Fig. 4 it is shown at the highest point. The weight of the cross-head and of the pallets tend to keep the rollers in engagement with the track.

Extending upwardly from the table 8 is a vertical flange 35 having inverted L-shaped bearing members 36 arranged thereon in which are pivot shafts 37 having pressing arms 38 journalled thereon. The inner ends of such arms, there being one for each mold, are provided with gear teeth 39. Guided in the members 36 are vertically reciprocable racks 40 engaging with the toothed segments 39 of said levers. A laterally projecting roller or cam 41 rotatably secured to each rack engages an annular track 42 on the vertical frame or pedestal 6, and serves to reciprocate the racks corresponding to the undulations in the cam track 42. Line $y$, $y$ in Fig. 5 shows in diagram a preferred arrangement of the cam track and the relation of its various undulations and levels to those of the annular track 32. In Figs. 2 and 4, the racks are in their lowermost position, and in Fig. 3 in the highest position.

Each swinging arm 38 carries a mold cover plate or platen 45, which is apertured at 45′ to provide clearance for the mold cores 24 when the cover is closed, as shown in Fig. 3. At the extreme end of each of the arms 38 is a cam roller 46 adapted to engage a segmental cam track 47 (see Fig. 3) supported on stationary members 48. The shape of this cam track and its relation to the other two cam tracks is indicated in diagram by line $z$, $z$, Fig. 5. As shown in this diagram, the starting end of the segmental cam track is sloping to gradually force the cover closed.

A mold filling device is indicated at 50 at a point above the table where the cam track 32 is lowest and where cam track 42 is lowest. It comprises a supply chute 51 and a hopper 52. The molds passing therebeneath form the bottom for the hopper. An agitator for feeding the material from the hopper and distributing it in the molds is shown at 53, and has radially extending arms 54. The agitator is preferably adapted to be revolved in one direction and then reversed to effect a thorough distribution to all parts of the mold, as described in my prior Patent No. 1,399,325, dated December 6, 1921.

In the operation of the device, the molds 23 pass beneath the filling device where the plastic material is poured in and leveled off, the operation being continuous as long as the table is kept rotating. At this time, as controlled by cam track 42 and roller 41, the cover 45 is raised in the position shown in Fig. 2. As each mold is carried beyond the filler, cam 41 engaging cam track 42 is moved upwardly, imparting a corresponding movement to the rack member 6, which swings arm 38 downwardly and roller 46 in its annular movement is engaged by the sloping end at the beginning of segmental cam track 47. As the mold advances further, the cover is forced by the cam 47 all the way closed, and the material in the molds is pressed at the top.

After being pressed at the top and the mold has been carried further around, the roller 29 encounters the first rise in cam track 32, thus forcing the cross-head 27, rods 30 and pallet 31 upwardly, the material at the bottom of the molds thus being correspondingly compressed. The parts are then in the position shown in Fig. 3.

This pressing of the molds at the top and bottom insures the production of a block of more uniform density than where pressure is applied in one direction only. Upon being carried around further, the cam roller 46 becomes disengaged from the segmental retaining cam track 47. Then the roller 41 in track 42 forces rack 40 downwardly, raising the cover. After the cover has been partially raised, roller 29, which has been engaging a level section in cam track 32, begins rising up a second incline, corresponding to the " ejecting block " section of the diagram of cam track 32, Fig. 5, thus raising the pallet 31 still further upwardly. When the cover has been completely raised, pallet 31, which has continued to move upwardly, finally reaches the position shown in Fig. 4, moving the blocks A entirely out of the mold. The parts then remain in this position for a considerable portion of the distance of travel.

While thus raised, the pallet and blocks are lifted off and other pallets substituted. The covers are then brushed by mechanism not shown, and the roller 29, engaging a rather abrupt incline in path 32 before reaching the filling device, allows the crosshead to move downwardly into the lowermost position, with the pallet 31 resting on the rods 30. Each mold in the carrier successively passes through this sequence of steps.

In Fig. 1, position I illustrates a plan of the mold with the cover locked in closed position. Position II shows the mold open with the cores and pallet in position. In position III, a similar view is shown with the pallet removed but with the mold and cores in place. Position IV shows the mold support 22 with the mold and cores removed. Position V is a section below the mold support showing a plan of the cross-head and roller.

The appearance of the molded blocks A is shown in Fig. 6. After molding, they must be dried in a kiln. In order to conveniently handle the plastic blocks to get them to the kilns, it might, in some installations, be desirable to support the machines in such manner that they may be readily transported.

While I have shown and described a preferred embodiment of my invention, it will be obvious that various changes and modifications may be made within the contemplation thereof and within the scope of the appended claims.

What I claim is:

1. A block pressing machine comprising a continuous traveling mold carrier, molds secured thereon and stationary with relation thereto, bottom members for the molds slidable in the molds, pivotally supported covers for the molds movable with relation thereto, and means for moving the bottom members and covers in proper sequence to effect the steps of filling, pressing, and ejecting, said cover moving means including the continuous cam track and a roller engaging in said track, which roller is operatively connected with the cover.

2. A block pressing machine comprising a frame, a rotary table carried thereby, molds fixed to the table, movable bottom members for the molds, swinging top members therefor, cam operated means for operating the swinging top members, including a continuous cam track on the frame and a cam member continuously engaged in said track, which member is operatively connected with the top member, cam operated means for moving the bottom members, said cam operated means being operated upon rotation of the table for effecting the steps of filling, pressing, and ejecting molded blocks in proper sequence.

3. A block pressing machine comprising a frame, a rotary table carried thereby, means for rotating the table, molds fixed to the table, movable bottom members for the molds, movable covers for the molds, means for reciprocating the bottom members, means for closing and opening the covers, and other means for forcing the covers closed and retaining them in closed position during a portion of the annular travel of the table, said means including rollers disposed at the outer ends of the covers and a stationary segmental cam member with which said rollers engage.

4. A block pressing machine comprising a frame, a continuous traveling mold carrier on said frame, a series of molds mounted on said carrier, bottom members for the molds, swinging covers therefor, pivoted pressure arms on the carrier to which said covers are secured, means at the pivoted end of the arms co-operating with means on the frame for swinging them to raise and lower the cover, and other means at the opposite ends of said arms for co-operating with other means on the frame to force said covers closed and maintain them closed during a portion of the travel of the carrier, said covers being carried on said arms between the pivoted point and said other means on the opposite ends of the arms.

5. A block pressing machine comprising a frame, a rotary table supported on the frame, means for rotating the table, a series of molds fixed on the table, bottom members for the molds, covers for the molds, swinging arms for supporting the covers, an undulating cam track on said frame, means at the inner ends of said arms for engaging the cam track to operate the swinging arms corresponding to the undulations in the cam track, a segmental track at the outside of said table, and means on the outside ends of said arms for engaging the segmental track to hold the mold covers closed during a portion of their annular travel.

6. A block pressing machine having a frame and a continuous traveling mold carrier on said frame, a series of molds on said frame, a series of horizontally pivoted arms on the carrier, each of said arms having a mold cover secured thereto, vertically movable means for swinging said arms through an arc from and to opened and closed positions, and a cam mechanism for effecting the movement of said vertically movable member for operating the mold covers.

7. A block pressing machine including a frame, a traveling mold carrier supported in the frame having a series of molds thereon, a series of pivoted mold covers on the frame, a cam for operating and engaging a track in the frame, and a geared operating connection between each cam and its respective cover.

8. A block pressing machine comprising a supporting frame, an annular traveling mold carrier supported by the frame, an annular series of molds on the carrier, a series of radially arranged pivoted arms on the carrier arranged to swing through a vertical arc, a mold cover carried by each arm, a series of vertically movable members, one of which is geared to each arm, a cam carried by each of said members, and a continuous undulating track on said frame engaging the cam.

In testimony whereof I hereunto affix my signature.

FRANCIS J. STRAUB.